(12) United States Patent
Akatsuka et al.

(10) Patent No.: US 10,035,538 B2
(45) Date of Patent: Jul. 31, 2018

(54) ELECTRIC POWER STEERING SYSTEM WITH MOTOR CONTROLLER

(71) Applicant: DENSO CORPORATION, Kariya, Aichi-pref. (JP)

(72) Inventors: Hisaya Akatsuka, Nagoya (JP); Motoaki Kataoka, Kariya (JP); Toshiki Matsumoto, Kariya (JP); Hisashi Iida, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 123 days.

(21) Appl. No.: 14/933,971

(22) Filed: Nov. 5, 2015

(65) Prior Publication Data

US 2016/0129934 A1 May 12, 2016

(30) Foreign Application Priority Data

Nov. 10, 2014 (JP) .................................. 2014-228240

(51) Int. Cl.
*B62D 5/04* (2006.01)
*B62D 15/02* (2006.01)

(52) U.S. Cl.
CPC .......... *B62D 5/0463* (2013.01); *B62D 15/025* (2013.01)

(58) Field of Classification Search
CPC .......................... B62D 5/0463; B62D 15/025
See application file for complete search history.

(56) References Cited

U.S. PATENT DOCUMENTS

| | | | | |
|---|---|---|---|---|
| 5,788,010 A * | 8/1998 | Mukai | .................. | B62D 5/0463 180/443 |
| 6,134,490 A | 10/2000 | Ito et al. | | |
| 6,148,949 A * | 11/2000 | Kobayashi | ........... | B62D 5/0463 180/404 |
| 7,136,732 B2 * | 11/2006 | Shimizu | ............... | B62D 5/0463 180/417 |
| 7,242,161 B2 * | 7/2007 | Okamoto | ............. | B62D 5/0448 180/446 |
| 7,909,131 B2 * | 3/2011 | Nishimura | ........... | B62D 5/0463 180/446 |

(Continued)

FOREIGN PATENT DOCUMENTS

| | | |
|---|---|---|
| JP | H09-221053 A | 8/1997 |
| JP | 2003-237607 A | 8/2003 |

(Continued)

*Primary Examiner* — Kevin Hurley
*Assistant Examiner* — Michael R Stabley
(74) *Attorney, Agent, or Firm* — Knobbe, Martens, Olson & Bear, LLP (57) ABSTRACT

An electric power steering system for a vehicle works to determine an assist command based on steering torque to produce assist torque through an electric motor for assisting in turning a steering wheel of the vehicle, also determines a tracking command for producing automatic steering torque which brings a value of a given physical quantity associated with steering of the vehicle into agreement a target value, and controls a response rate at which a value of a given physical quantity is brought into agreement with a target value in a feedback mode. A motor driver works to actuate an electric motor based on the sum of the assist command and the tracking command to output the torque for steering the system vehicle.

12 Claims, 11 Drawing Sheets

(56) References Cited

U.S. PATENT DOCUMENTS

| | | | | |
|---|---|---|---|---|
| 8,175,771 B2* | 5/2012 | Ukai | B62D 5/046 | 180/443 |
| 8,260,500 B2* | 9/2012 | Murakami | B62D 5/0463 | 180/446 |
| 8,781,682 B2* | 7/2014 | Suzuki | B62D 5/0463 | 701/41 |
| 2001/0027364 A1* | 10/2001 | Matsuoka | B62D 5/0463 | 701/41 |
| 2002/0173882 A1* | 11/2002 | Tobaru | B60G 17/018 | 701/1 |
| 2006/0012323 A1* | 1/2006 | Endo | B62D 5/0472 | 318/432 |
| 2007/0168093 A1* | 7/2007 | Nishiyama | B62D 5/0466 | 701/41 |
| 2007/0227806 A1* | 10/2007 | Wei | B62D 5/0472 | 180/446 |
| 2008/0021614 A1* | 1/2008 | Endo | B62D 5/0463 | 701/41 |
| 2008/0027609 A1* | 1/2008 | Aoki | B62D 5/0463 | 701/43 |
| 2008/0297077 A1* | 12/2008 | Kovudhikulrungsri | H02P 21/22 | 318/400.02 |
| 2009/0024278 A1 | 1/2009 | Kondo et al. | | |
| 2009/0192675 A1* | 7/2009 | Yamakado | B60T 8/1755 | 701/38 |
| 2010/0108432 A1* | 5/2010 | Okazaki | B62D 6/001 | 180/446 |
| 2010/0168963 A1* | 7/2010 | Yamamoto | B62D 5/0463 | 701/42 |
| 2010/0217487 A1* | 8/2010 | Murakami | B62D 5/0472 | 701/42 |
| 2010/0256871 A1* | 10/2010 | Mitchell | A61B 69/004 | 701/42 |
| 2011/0022271 A1* | 1/2011 | Ueda | B62D 5/046 | 701/41 |
| 2012/0109410 A1 | 5/2012 | Hanzawa et al. | | |
| 2013/0041557 A1* | 2/2013 | Endo | B62D 1/286 | 701/42 |
| 2013/0311044 A1* | 11/2013 | Tamaizumi | B62D 5/0463 | 701/42 |
| 2014/0058630 A1* | 2/2014 | Kezobo | B62D 5/0463 | 701/42 |
| 2014/0081525 A1* | 3/2014 | Itamoto | B62D 5/0484 | 701/42 |
| 2014/0149000 A1* | 5/2014 | Tamura | B62D 5/0481 | 701/42 |
| 2014/0180544 A1* | 6/2014 | Itamoto | B62D 5/049 | 701/41 |
| 2014/0195122 A1* | 7/2014 | Oniwa | G05D 17/02 | 701/41 |
| 2014/0238768 A1* | 8/2014 | Tamaizumi | B62D 5/0469 | 180/446 |
| 2014/0336878 A1* | 11/2014 | Yanai | G01D 5/145 | 701/41 |
| 2014/0345965 A1* | 11/2014 | Ura | B62D 5/0835 | 180/404 |
| 2015/0191200 A1* | 7/2015 | Tsubaki | B62D 15/0285 | 701/42 |
| 2015/0217801 A1* | 8/2015 | Takeda | B62D 6/008 | 701/42 |
| 2015/0225018 A1* | 8/2015 | Oya | B62D 15/025 | 701/41 |

FOREIGN PATENT DOCUMENTS

| | | |
|---|---|---|
| JP | 2007-106308 | 4/2007 |
| JP | 2010-188917 | 9/2010 |
| JP | 2011-037394 | 2/2011 |
| JP | 2011-183883 | 9/2011 |
| JP | 2015-033942 A | 2/2015 |
| WO | 2011/152214 A1 | 12/2011 |

* cited by examiner

| APPLICATION | RESPONSIVENESS (FREQUENCY fc) |
|---|---|
| CRASH DAMAGE MITIGATION SYSTEM | HIGH |
| LANE-KEEP CONTROL | LOW |
| OTHER | MIDDLE |

ELECTRIC POWER STEERING SYSTEM WITH MOTOR CONTROLLER

CROSS REFERENCE TO RELATED DOCUMENT

The present application claims the benefit of priority of Japanese Patent Application No. 2014-228240 filed on Nov. 10, 2014, the disclosure of which is incorporated herein by reference.

BACKGROUND OF THE INVENTION

1 Technical Field

This disclosure relates generally to an electric power steering system (also called a steering assist system) which is equipped with a motor controller engineered to control operation of an electric motor to produce steering assist torque and/or automatic steering torque.

2 Background Art

Japanese Patent First Publication No. H09-221053 teaches an automotive steering system which analyzes image information derived by a camera which captures an image of a view ahead of a vehicle to calculate a positional relation between a system vehicle equipped with this system and a traffic lane on which the system vehicle is now running, and performs a lane-keep control mode and a power steering control mode using a single actuator (e.g., an electric motor). The lane-keep control mode is to keep the system vehicle in the lane. The power steering control mode is to produce assist torque to assist a vehicle driver in assisting steering the system vehicle.

The above type of steering system is usually equipped with a torsion bar and a torque sensor. The torsion bar is arranged closer to a steering wheel than an electric motor is. The torque sensor works to measure twisting of the torsion bar to determine the degree of torque for steering the system vehicle (which will also be referred to as steering torque below). The torsion bar, however, also experiences twisting when the motor is actuated to output an automatic steering torque as well as when the steering wheel is turned. The steering system, therefore, encounters the drawback in that the twisting of the torsion bar arising from the actuation of the motor to produce the automatic steering torque will result in generation of mechanical vibration in the steering wheel (correctly, a portion of a steering power transmission mechanism which lies between the steering wheel and the torsion bar.

SUMMARY

It is therefore an object to provide an electric power steering system equipped with a motor controller which is designed to minimize vibration of steering torque upon actuation of an electric motor which is used in producing assist torque and/or automatic steering torque for steering the vehicle.

According to one aspect of the invention, there is provided an electric power steering system for a vehicle equipped with a steering mechanism through which steering power is transmitted from a mechanical steering member which is manually operated by a vehicle operator of a system vehicle having this system mounted therein. The electric power steering system comprises: (a) an electric motor which is joined to the steering mechanism and works to output torque for steering the system vehicle; (b) a torsion bar which is installed in the steering mechanism and located between the mechanical steering member and a joint of the electric motor and the steering mechanism; (c) a torsion sensor which measures twisting of the torsion bar as a steering torque; (d) an assist controller which works to determine an assist command as a function of the steering torque, as derived by the torsion sensor, the assist command being to produce assist torque through the electric motor for assisting in turning the mechanical steering member; (e) a target tracking controller which works to determine a tracking command which produces through the electric motor automatic steering torque which brings a value of a given physical quantity associated with steering of the system vehicle into agreement with a target value; (f) a response controller which works to control a response rate at which the value of the given physical quantity is brought by the target tracking controller into agreement with the target value; and (g) a motor driver which works to actuate the electric motor based on sum of the assist command and the tracking command to output the torque for steering the system vehicle.

Specifically, the electric power steering system is engineered to control the response rate at which the automatic steering torque is produced, so that it will be insensitive to noise, thus suppressing the steering vibration which is caused by the output torque from the electric motor to the torsion bar of the torque sensor.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiments but are for the purpose of explanation and understanding only.

In the drawings.

DESCRIPTION OF THE PREFERRED EMBODIMENTS

First Embodiment

Figure 1:
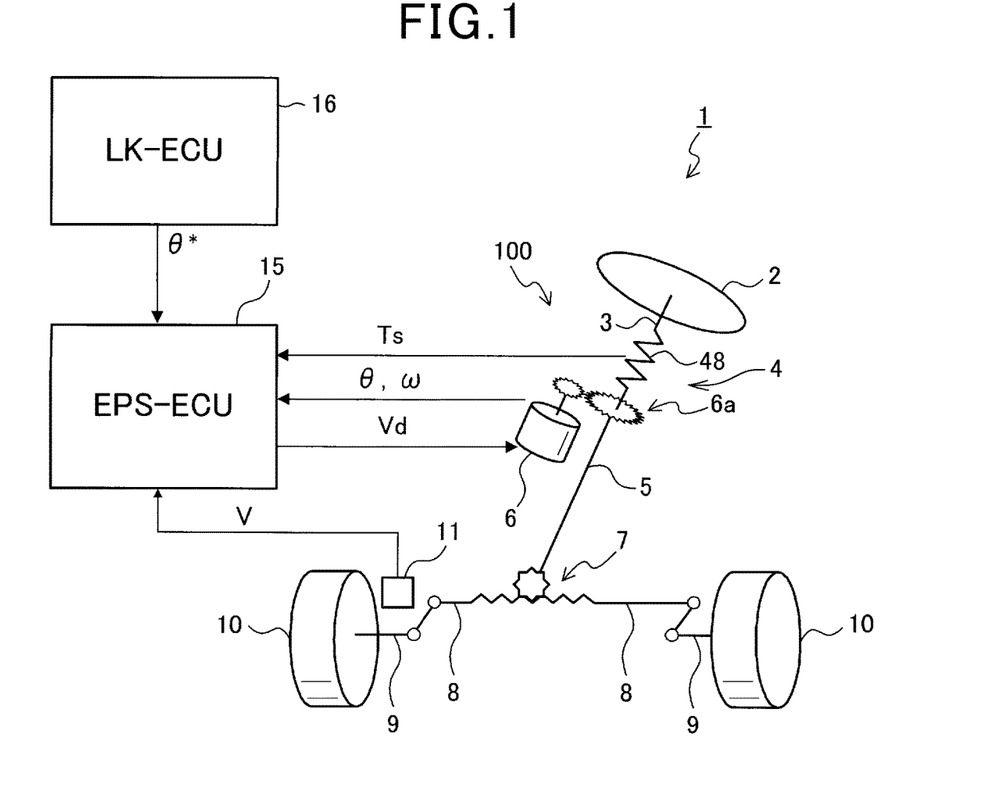
FIG. 1 is a diagram which illustrates an electric power steering system according to the first embodiment.

Referring to the drawings, wherein like reference numbers refer to like parts in several views, particularly to FIG. 1, there is shown an electric power steering system (also called power assisted steering system) 1 according to an embodiment which may be used in automotive vehicles. The electric power steering system 1 is engineered to perform a power-assisted steering mode and a target tracking mode. The power-assisted steering mode is to assist a vehicle driver in turning a steering wheel 2 using an electric motor 6. The target tracking mode is to perform automatic steering which controls steering of a vehicle in which the electric power steering system 1 is installed (which will also be referred to as a system vehicle below) along a target course set in a traffic lane. The target tracking mode also includes a lane-keep control mode and a steering control mode executed in autonomous driving (also called autonomous cruising) of the system vehicle.

The electric power steering system 1, as clearly illustrated in FIG. 1, includes the steering wheel 2, a steering shaft 3, a torque sensor 4, an intermediate shaft 5, the electric motor 6, a steering gear box 7, tie rods 8, knuckle arms 9, and tires 10. The electric power steering system 1 also includes an EPS (Electric Power Steering)-ECU 15 and an LK (Lane-Keep)-ECU 16. The steering wheel 2 is a mechanical steering member which is manually operated by a vehicle operator or driver of the system vehicle and on which torque is exerted by the driver.

The steering wheel 2 is joined to an end of the steering shaft 3. The torque sensor 4 is connected at an end thereof to the other end of the steering shaft 3. The intermediate shaft 5 is joined to the other end of the torque sensor 4. In the following discussion, a component train extending from the steering shaft 3 to the intermediate shaft 5 through the torque sensor 4 will also be referred to as a steering shaft train below.

The torque sensor 4 works to measure a steering torque Ts. Specifically, the torque sensor 4 is equipped with a torsion bar 48 which connects between an end of the steering shaft 3 and an end of the intermediate shaft 5. The torque sensor 4 functions as a torsion sensor to measure twisting or a twisted angle of the torsion bar 48 and determines it as the steering torque Ts. In other words, the steering torque Ts expresses a degree of torque acting on the torsion bar 48 which causes the torsion bar 48 to be twisted. Note that the steering torque, as referred to in the following discussion, means a degree of torque arising from twisting of the torsion bar 48 unless otherwise specified.

The electric motor 6 is joined to an end of the torsion bar 48 of the torque sensor 4 (i.e., a lower end of the torsion bar 48, as viewed in FIG. 1) to which the intermediate shaft 5 is joined. In other words, the torsion bar 48 is disposed between the steering wheel 2 and a joint of the electric motor 6 to the intermediate shaft 5. The electric motor 6 serves as an actuator to produce the assist torque in the power-assisted steering mode and automatic steering torque in the target tracking mode. The electric motor 6 outputs torque, which is, in turn, transmitted to the intermediate shaft 5 through a speed reducer 6a. The speed reducer 6a is made up of a worm gear installed on the head of an output shaft of the electric motor 6 and a worm wheel joined coaxially with the intermediate shaft 5 in mesh with the worm gear.

The torque produced by the electric motor 6 is, as described above, transmitted to the intermediate shaft 5. When the steering wheel 2 is turned, so that the intermediate shaft 5 rotates, or the intermediate shaft 5 is rotated by a reactive force transmitted from the road surface, it will cause the rotation of the intermediate shaft 5 to be transmitted to the electric motor 6 through the speed reducer 6a, so that the electric motor 6 rotates.

The electric motor 6 is implemented by, for example, a brushless motor equipped with a rotation sensor (also called a position sensor) such as a resolver. The rotation sensor works to measure operating conditions of the electric motor 6 which at least include an angle by which the electric motor 6 rotates from a reference position (i.e., an angular position of the electric motor 6) and which will also be referred to as a rotation angle $\theta$ of the electric motor 6 below, an angular velocity $\omega$ of the electric motor 6, and an angular acceleration $\alpha$ of the electric motor 6. The rotation sensor may alternatively be engineered to determine a steering angle, a steering angular velocity, and a steering angular acceleration which are derived by multiplying the rotation angle $\theta$, the angular velocity $\omega$, and the angular acceleration $\alpha$ by a gear ratio of the speed reducer 6a.

The end of the intermediate shaft 5 which is opposite the end thereof connecting with the torque sensor 4 is coupled with the steering gear box 7. The steering gear box 7 is made by a gear train including a rack and a pinion gear. Specifically, the pinion gear is installed on the end of the intermediate shaft 5. The rack meshes with the pinion gear. In operation, when the driver turns the steering wheel 2, the intermediate shaft 5 (i.e., the pinion gear) will rotates, thereby moving the rack laterally. The tie rods 8 are joined to the ends of the track, so that they are laterally moved along with the movement of the rack. This causes the knuckle arms 9 to be drawn or pushed by the tie rods 8, thereby steering the tires 10 (i.e., steering the wheels).

Figure 2:
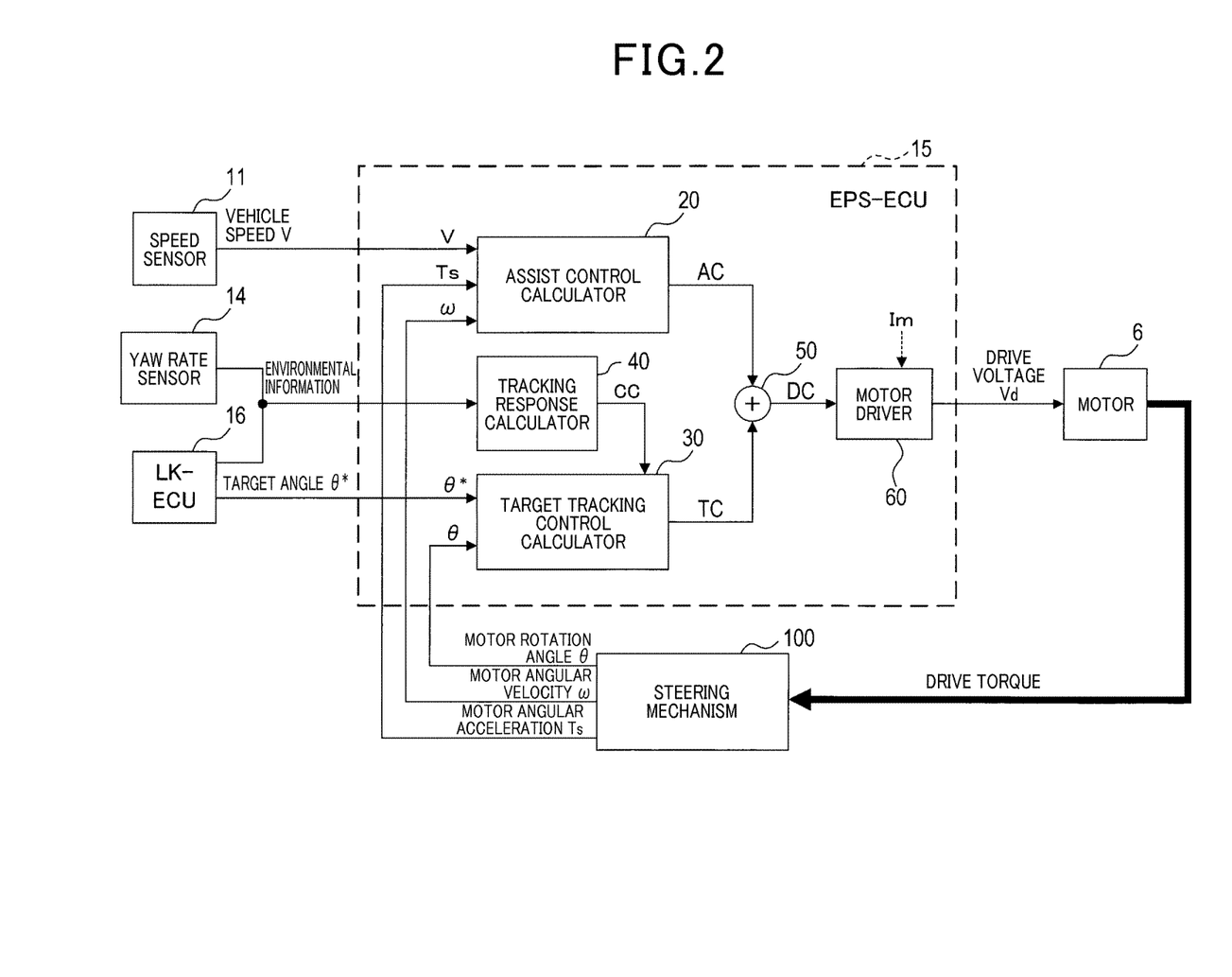
FIG. 2 is a block diagram which illustrates a structure of an electric power steering ECU installed in the electric power steering system of FIG. 1.

The speed sensor 11 is installed on a given part of the system vehicle. The speed sensor 11 works to measure the speed V of the system vehicle and outputs a signal indicative thereof to the EPS-ECU 15. In the following discussion, a power transmission mechanism which includes from the steering wheel 2 to the tires 10 and through which a steering force or power, as produced by the steering wheel 2, is transmitted to each of the tires 10 will also be referred to as a steering mechanism 100 below. The steering mechanism 100 is, as can be seen in FIGS. 1 and 2, connected to the electric motor 6.

In operation of the steering mechanism 100, when the steering wheel 2 is turned by the driver, it will cause torque to be transmitted from the steering wheel 2 to the steering gear box 7 through the steering shaft 3, the torque sensor 4, and the intermediate shaft 5. The steering gear box 7 works to convert the rotation of the intermediate shaft 5 into lateral motion of the tie rods 8, thereby steering the tires 10.

The LK-ECU 16 operates on electric power supplied from a battery (not shown) mounted on the system vehicle. The LK-ECU 16 analyzes an image of a view in front of the system vehicle, as taken by a camera (not shown) installed in the system vehicle, to calculate locations of a traffic lane and the system vehicle on the traffic lane, and determines a target course based on the calculated locations. The LK-ECU 16 also analyzes the speed V of the system vehicle and a steered angle of the steering wheel 2 to calculate a target angle $\theta^*$ that is a target value of an angle by which the electric motor 6 is to be rotated (or a target steering angle) to make the system vehicle track the target course, and outputs the target angle $\theta^*$ to the EPS-ECU 15. The determination of the target angle $\theta^*$ may be achieved in a known way used in the lane keep assist technology, and explanation thereof in detail will be omitted here.

The EPS-ECU 15, like the LK-ECU 16, operates on electric power supplied from the battery mounted on the system vehicle. The EPS-ECU 15 calculates a final command DC as a function of the target angle $\theta^*$, as sent from the LK-ECU 16, the steering torque Ts, as measured by the torque sensor 4, the rotation angle $\theta$, the angular velocity $\omega$, and the angular acceleration $\alpha$, as outputted from the electric motor 6, and the vehicle speed V, as measured by the speed sensor 11.

The final command DC is the sum of an assist command AC that is a current value required for the electric motor 6 to produce the assist torque and a tracking command TC that is a current value required for the electric motor 6 to produce the automatic steering torque, which will be described later in detail. The EPS-ECU 15 determines a drive voltage Vd as a function of the final command DC and outputs it to the electric motor 6 to produce the assist torque and the automatic steering torque.

Specifically, the EPS-ECU 15 works to control the operation of the electric motor 6 through the drive voltage Vd to control steering characteristics, that is, to control the steering mechanism 100 driven by the electric motor 6.

EPS-ECU

The EPS-ECU 15, as illustrated in FIG. 2, includes an assist control calculator 20, a target tracking control calculator 30, a tracking response calculator 40, an adder 50, and a motor drive circuit 60. The assist control calculator 20 serves to produce the assist command AC.

The target tracking control calculator 30 works to produce the tracking command TC. The tracking response calculator 40 works to produce the correction command CC.

The adder 50 adds the assist command AC and the tracking command TC to derive the drive command DC that is a current value required to drive the electric motor 6.

The motor drive circuit 60 is responsive to the drive command DC to apply the drive voltage Vd to the electric motor 6. In the case where the electric motor 6 is a three-phase motor, the motor drive circuit 60 converts the drive voltage Vd into respective voltages for three phases of the electric motor 6, thereby controlling energization of the electric motor 6. The assist control calculator 20, the target tracking control calculator 30, the tracking response calculator 40, and the adder 50 may be logically realized by a CPU performing given control programs to execute the tasks thereof.

In the above case, the EPS-ECU 15 performs the control programs cyclically at a given time interval in order to secure a required control response in the target tracking mode (or the lane-keep control mode). The time interval is, for example, several hundred μs to several hundred ms, but is not limited to this as long as it will not adversely affect the target tracking operation.

The EPS-ECU 15 works to update the drive command DC at the above time interval. The realization of the assist control calculator 20, the target tracking control calculator 30, the tracking response calculator 40, the adder 50, and the subtractor 55 by software is merely an example. At least one of them may be constructed by hardware such as a logic circuit.

Motor Drive Circuit

The motor drive circuit 60 is responsive to the drive command DC to output the drive voltage Vd to the electric motor 6 to exert on the steering shaft train a degree of torque (i.e., the assist torque and/or the automatic steering torque) that is as a function of the drive voltage Vd. Specifically, the motor drive circuit 60 works to regulate the drive voltage Vd so as to bring an energization current Im flowing through the electric motor 6 into agreement with a target current that is the drive command DC in the feedback mode, so that the steering shaft train produces a required degree of torque. This type of motor driver circuit 60 is well known in the art, for example, Japanese Patent Second Publication No. 2013-52793, and explanation thereof in detail will be omitted here.

Assist Control Calculator

The assist control calculator 20 works to produce the assist command AC as a function of the steering torque Ts, the angular velocity $\omega$ of the electric motor 6, and the speed V of the system vehicle. The assist command AC is to create a degree of torque through the electric motor 6 in order to assist the driver in turning the steering wheel 2 (i.e., the tires 10) in a conventional way and/or in order to make the driver feel, through the steering wheel 2, the sense of transmission of a reactive force from the road surface to the driver and/or the sense of steering the tires 10.

Specifically, the assist control calculator 20 calculates a basic assist degree of torque required to achieve the sense of transmission of steering torque to the road surface against the reactive force from the road surface as a function of the steering torque Ts and the speed V of the system vehicle, also calculates an assist compensating degree of torque as a function of the steering torque Ts and the angular velocity $\omega$ of the electric motor 6, and adds a value, as derived by multiplying the assist compensating degree of torque by a gain that is a function of the speed V of the system vehicle, to the basic assist degree of torque to derive the assist command AC in the form of electric current. The calculation of the assist command AC is not limited to the above, but may alternatively be achieved in another way known in the art.

Target Tracking Control Calculator

The target tracking control calculator 30 works to calculate the tracking command TC as a function of the target angle $\theta^*$ and the rotation angle $\theta$ (will also be referred to as an actual angle below) of the electric motor 6. The tracking command TC is a current command value that is an electric current to produce the automatic steering torque through the electric motor 6 which is required to bring the actual angle $\theta$ into agreement with the target angle $\theta^*$.

Figure 3:
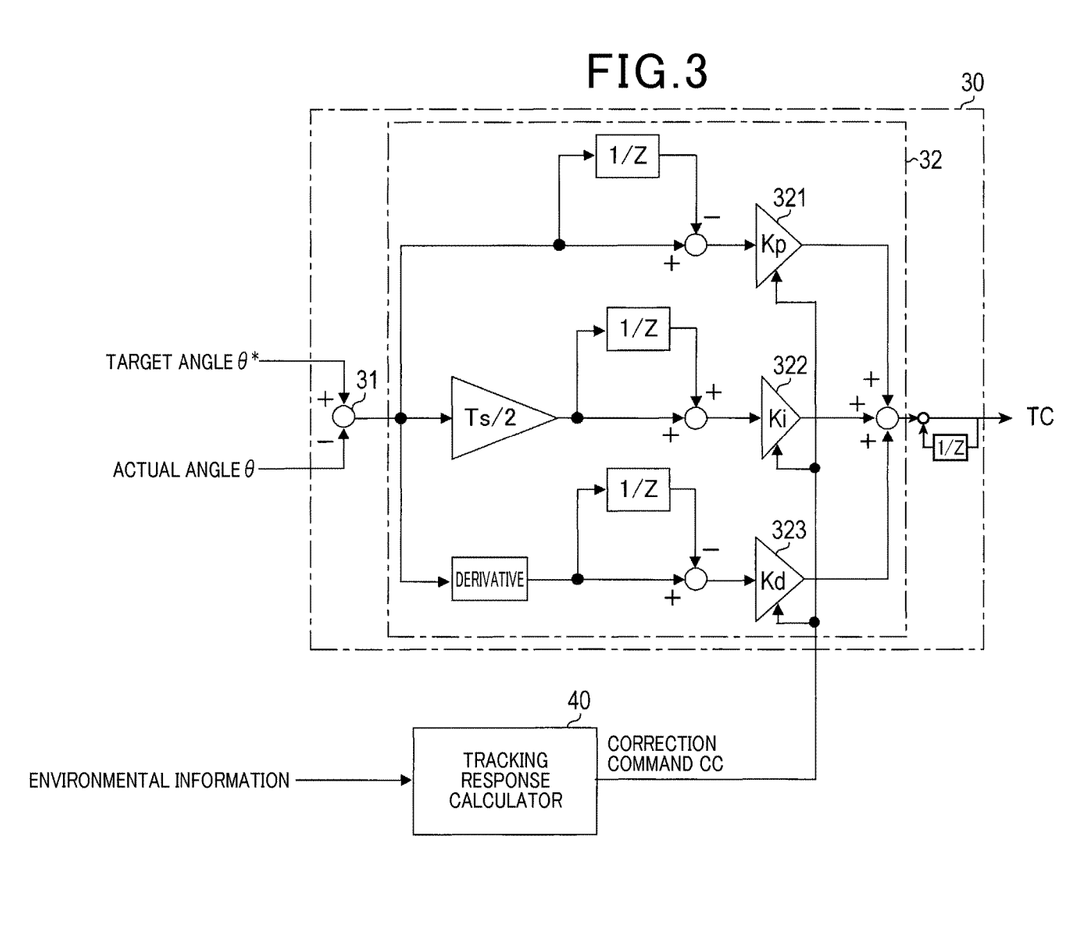
FIG. 3 is a block diagram which illustrates a structure of a target tracking control calculator installed in the electric power steering ECU of FIG. 2.

Specifically, the target tracking control calculator 30, as illustrated in FIG. 3, includes a subtractor 31 and a characteristic determiner 32. The subtractor 31 works to determine a deviation $\Delta\theta$ ($=\theta^*-\theta$) of the actual angle $\theta$ from the target angle $\theta^*$.

The characteristic determiner 32 works to apply PID (Proportional-Integral-Derivative) gains to the deviation $\Delta\theta$ to determine a control characteristic. The characteristic determiner 32 has a known structure, as illustrated in FIG. 3, which Bilinear-transforms a mathematical formula developing a typical PID controller for discretizing it to realize a control structure defined by the transformed mathematical formula.

The characteristic determiner 32 is equipped with a proportional gain applier 321, an integral gain applier 322, and a derivative gain applier 323. The proportional gain applier 321 works as a gain multiplier to multiply a proportional term in a PID algorithm which is proportional to the deviation $\Delta\theta$ by a gain Kp.

The integral gain applier 322 works as a gain multiplier to multiply an integral term in the PID algorithm which represents an integral of the deviation $\Delta\theta$ by a gain Ki. The derivative gain applier 323 works as a gain multiplier to multiply a derivative term in the PID algorithm which is a derivative of the deviation $\Delta\theta$ by a gain Kp.

The values of the gains Kp, Ki, and Kd to be produced by the gain appliers 321 to 323 are modified by the correction command CC. Specifically, the gains Kp, Ki, and Kd are multiplied by $\alpha$ (i.e., $\alpha\times$Kp, $\alpha\times$Ki, and $\alpha\times$Kd) wherein $\alpha$ expresses the responsiveness of the target tracking mode which will also be referred to as the responsiveness $\alpha$. The responsiveness $\alpha$ (i.e., the tracking response rate) of the target tracking mode in the tracking command TC increases with increases in the PID gains (i.e., the gains Kp, Ki, and Kd), while it decreases with decreases in the PID gains. How to determine the responsiveness $\alpha$ will be described later in detail.

Tracking Response Calculator

Figure 4:
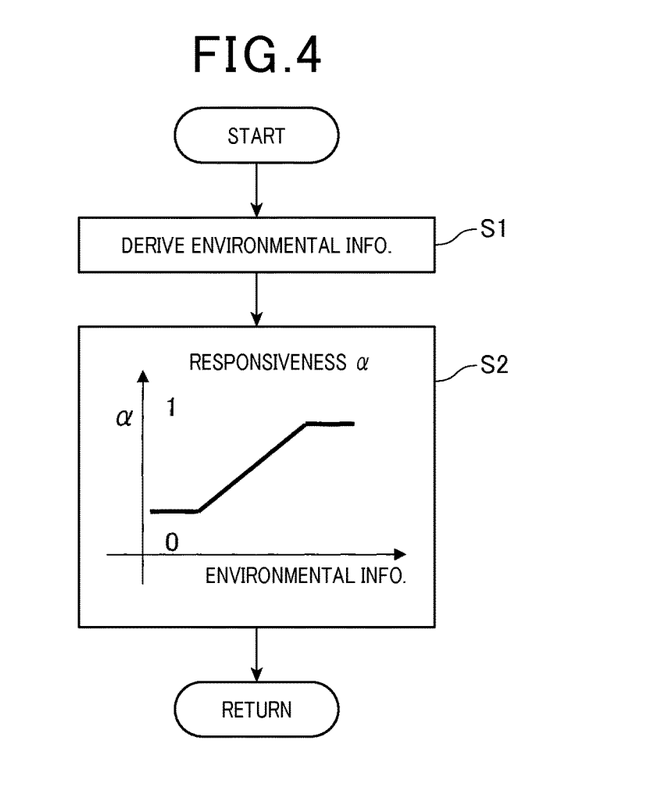
FIG. 4 is a flowchart of a program to be executed by a tracking response controller installed in the electric power ECU of FIG. 2 to determine a response rate in a tracking control mode.

The tracking response calculator 40 works as a response controller to change the PID gains Kp, Ki, and Kd used in the PID algorithm illustrated in FIG. 3 in order to alter the tracking response rate (i.e., the response rate in the target tracking mode). Specifically, the tracking response calculator 40 performs a program, as illustrated in FIG. 4, to determine the value $\alpha$, and outputs the value $\alpha$ as the correction command CC.

After entering the program, the routine proceeds to step S1 wherein surrounding environmental information about the electric power steering system 1 (i.e., the system vehicle) is derived.

Specifically, the environmental information represents the curvature of the road on which the system vehicle is not running, a need for emergency avoidance which represents a degree of need for the system vehicle to perform an emergency avoidance maneuver, a lateral displacement that is a deviation of the system vehicle from a target position in the lateral direction within a traffic lane, a positional deviation of the system vehicle from a target locus predetermined when the system vehicle starts running, and selected control mode information which indicates a selected control mode that is one of steering control modes to be now selected and performed by the system vehicle.

The environmental information is information used by the LK-ECU 16 in the target tracking mode or derived from execution of the target tracking mode and thus acquired from the LK-ECU 16 in step S1. The environmental information may alternatively be obtained from outputs of sensors installed in the system vehicle equipped with the electric power steering system 1. For instance, the curvature of the road may be derived from map information produced by a navigation ECU installed in the system vehicle or an output from the yaw rate sensor 14.

Figure 5:
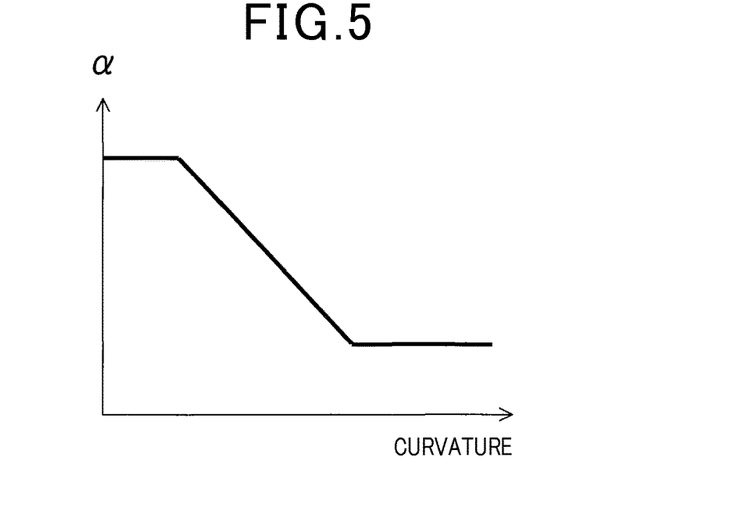
FIG. 5 is a graph which demonstrates a relation between a response rate and a curvature of a road on which a system vehicle is running.

Subsequently, the routine proceeds to step S2 wherein the responsiveness $\alpha$ of the target tracking mode is determined as a function of the curvature of the road on which the system vehicle is now running. Specifically, the responsiveness $\alpha$ is, as illustrated in FIG. 5, decreased with an increase in curvature of the road. The responsiveness $\alpha$ is delimited by an upper and a lower limit which are preselected.

Figure 6:
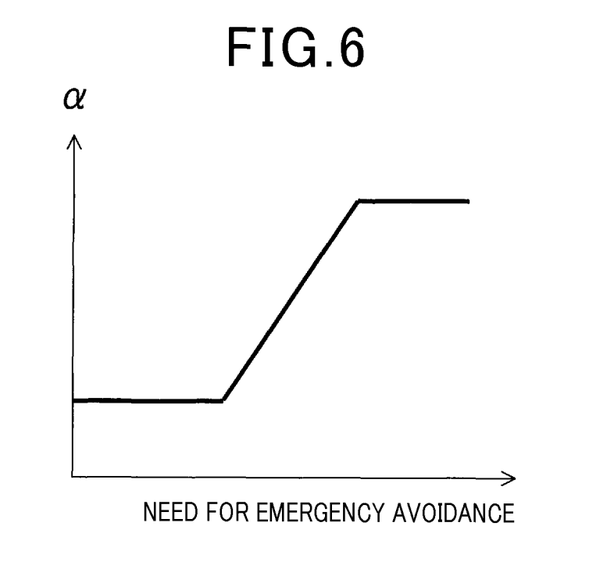
FIG. 6 is a graph which demonstrates a relation between a response rate and a degree of need for emergency avoidance.
Figure 7:
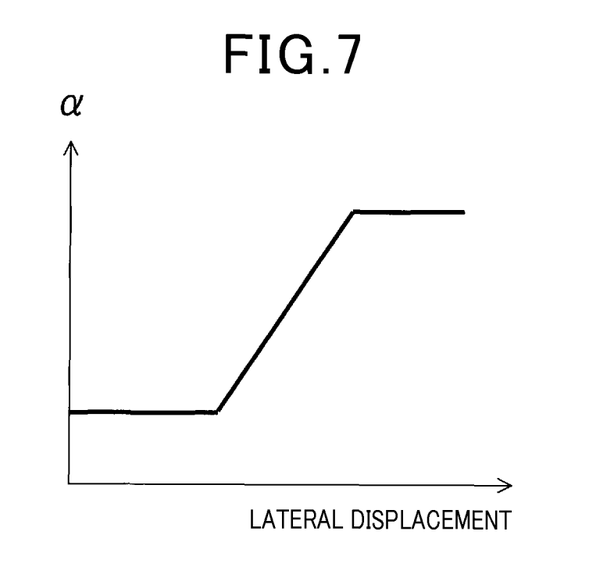
FIG. 7 is a graph which demonstrates a relation between a response rate and a lateral displacement that is a deviation of a system vehicle from a target position in a lateral direction within a traffic lane.

The responsiveness $\alpha$ may also or alternatively be determined as a function of the need for emergency avoidance. Specifically, the responsiveness $\alpha$ is, as illustrated in FIG. 6, increased with an increase in need for emergency avoidance. The responsiveness $\alpha$ is delimited by an upper and a lower limit. The responsiveness $\alpha$ may also or alternatively be determined as a function of the lateral displacement. Specifically, the responsiveness $\alpha$ is, as illustrated in FIG. 7, increased with an increase in the lateral displacement. The responsiveness $\alpha$ is delimited by an upper and a lower limit.

Figure 8:
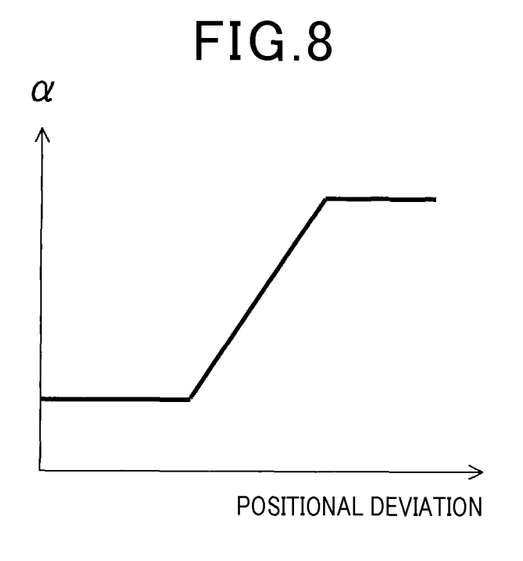
FIG. 8 is a graph which demonstrates a relation between a response rate and a positional deviation of the system vehicle from a target locus predetermined when a system vehicle starts running.

The responsiveness $\alpha$ may also or alternatively be determined as a function of the positional deviation of the system vehicle from the target locus. Specifically, the responsiveness $\alpha$ is, as illustrated in FIG. 8, increased with an increase in the positional deviation. The responsiveness $\alpha$ is delimited by an upper and a lower limit.

In step S2, the tracking response calculator 40 calculates the responsiveness $\alpha$ as a function of at least one of the above environmental parameters for the system vehicle which are expressed by the environmental information and produce the correction command CC which indicates the value of the responsiveness $\alpha$. In the case of use of the two or more environmental parameters in determining values of the responsiveness $\alpha$, an average, a weighted average, or a weighted sum of the values of the responsiveness $\alpha$ is calculated to derive the correction command CC. The tracking response calculator 40 outputs the correction command CC to the characteristic determiner 32 to multiply the PID gains (i.e., the proportional gain Kp, the integral gain Ki, and the derivative gain Kd) by the value of the responsiveness $\alpha$.

The responsiveness $\alpha$ may also be corrected depending upon the selected control mode which is one of the steering control modes, in other words, one of applications selected by the system vehicle to be executed in the selected one of the steering control modes.

Figure 9:
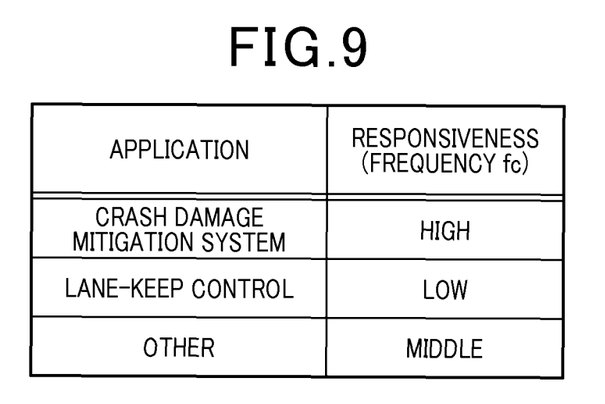
FIG. 9 is a table which demonstrates a relation between a response rate and each of steering control modes to be selected by a system vehicle.

For instance, when the electric power steering system 1 is used in a crash damage mitigation system, as illustrated in FIG. 9, installed in the system vehicle, the tracking response calculator 40 increases the responsiveness $\alpha$. Specifically, the tracking response calculator 40 multiplies the responsiveness $\alpha$, as derived in the above way, by a coefficient near a given maximum value and fixes it as the value of the responsiveness $\alpha$ indicated by the correction command CC.

The above adjustment of the value of the responsiveness $\alpha$ is to quickly complete the automatic steering in the target tracking mode when the crash damage mitigation system works to control steering of the system vehicle to avoid an accidental collision with an obstacle.

When the electric power steering system 1 is used in the lane keep control mode, the tracking response calculator 40, as illustrated in FIG. 9, sets the responsiveness $\alpha$ to a lower value which is smaller than that selected in the crash damage mitigation system. Specifically, the tracking response calculator 40 multiplies the responsiveness α, as derived in the above way, by a coefficient near a given minimum value and fixes it as the value of the responsiveness α indicated by the correction command CC. This is because the lane keep control mode is not required to have a higher responsiveness. The lower value of the responsiveness α is selected in order to enhance the suppression of the steering vibration.

When the electric power steering system 1 is used in the other application, the tracking response calculator 40, as illustrated in FIG. 9, sets the responsiveness α to a middle value which is higher than that selected in the lane keep control mode. For example, the value of the responsiveness α, as determined in the above way, is used as it is.

Referring back to FIG. 4, after step S2, the tracking response calculator 40 then repeats the program.

Beneficial Effects of the Electric Power Steering System

The electric power steering system 1 of the first embodiment offers the following beneficial advantages.

The electric power steering system 1 is, as described above, equipped with the assist control calculator 20, the target tracking control calculator 30, and the tracking response calculator 40. The assist control calculator 20 works to produce the assist command AC and analyzes the steering torque Ts to develop a degree of torque through the electric motor 6 to assist the driver of the system vehicle in turning the steering wheel 2 (i.e., the tires 10). The target tracking control calculator 30 works to determine a target value of a physical quantity associated with the steering (i.e., the target angle θ*, that is, the target course set in the traffic lane on which the system vehicle is running) and produce the automatic steering torque which brings a detected value of the physical quantity (i.e., the actual angle θ) into agreement with the target value. Specifically, the target tracking control calculator 30 produces the tracking command TC for creating the automatic steering torque through the electric motor 6 which is required to bring the actual angle θ of the electric motor 5 into agreement with the target angle θ*. The tracking response calculator 40 works to control the response rate (i.e., the responsiveness α) at which the target tracking control calculator 30 brings the detected value of the physical quantity into agreement with the target value. The motor drive circuit 60 is responsive to the sum of the assist command AC and the tracking command TC to control the output torque from the electric motor 6.

In short, the electric power steering system 1 is engineered to control the response rate at which the automatic steering torque is produced, so that it will be insensitive to noise (i.e., oscillation of an input of the target angle θ* to the characteristic determiner 32), thus suppressing the steering vibration which is caused by the output torque from the electric motor 6 to the torsion bar 48 of the torque sensor 4.

The tracking response calculator 40, as described above, obtains the environmental information about the EPS-ECU 15 and alters the degree to which the responsiveness α (i.e., the response rate) is restricted as a function of the environmental information. Specifically, the response rate is increased with a decrease in curvature of the road. The response rate is additionally or alternatively increased with an increase in at least one of the need for emergency avoidance, the lateral displacement, and the positional deviation of the system vehicle.

This enables the response rate at which the detected value of the physical quantity is brought into agreement with the target value, that is, the actual angle θ of the electric motor 5 is brought into agreement with the target angle θ* to be suited to the environmental condition(s) of the system vehicle. In other words, the response rate is suited to the suppression of the steering vibration.

The tracking response calculator 40 also works to change the frequency characteristic of the tracking command TC as a function of the environmental information. The frequency characteristic expresses the response rate of the tracking command TC depending upon a frequency of the input signal to the tracking response calculator 40. The response rate of the tracking command TC is, therefore, changed with a change in frequency of the input signal to the tracking response calculator 40. This enables the frequency characteristic of the tracking command TC to be suited to the environmental condition(s) of the system vehicle.

The target tracking control calculator 30 is, as described above, equipped with a plurality of control units (i.e., the proportional gain applier 321, the integral gain applier 322, and the derivative gain applier 323), but may alternatively be designed to include at least one of them. The tracking response calculator 40 works to change at least one of control parameters (i.e., the PID gains) provided by the control units (i.e., the gain appliers 321, 322, and 323).

Therefore, the electric power steering system 1 is engineered to change the control parameter in at least one of the gain appliers 321, 322, and 323, thereby ensuring the stability in altering the response rate in the target tracking mode.

Specifically, the tracking response calculator 40 serves to change at least one of the control parameters (i.e., the gains Kp, Ki, and Kd) to be applied by the gain appliers 321, 322, and 323 to the proportional, the integral, and the derivative term in the PID algorithm used in the PID controller developed by the characteristic determiner 32. This enables the response rate to be changed as required in the target tracking mode.

The tracking response calculator 40 also obtains control type information representing one of the steering control modes selected by the system vehicle and alters or sets the response rate to a value preselected according to the selected one of the steering control modes indicated by the control type information. This enables the response rate to be suited to the selected one of the steering control modes.

Second Embodiment

The electric power steering system 1A of the second embodiment will be described below with reference to FIG. 10. The same reference numbers as employed in the first embodiment will refer to the same parts, and explanation thereof in detail will be omitted here.

The electric power steering system 1A includes the target tracking control calculator 30 and the tracking response calculator 40. The target tracking control calculator 30 is, as can be seen in FIG. 10, equipped with a low-pass filter 41 which filters the target angle θ* inputted to tracking control calculator 30. The tracking response calculator 40 is engineered to produce the correction command CC which alters a cut-off frequency fc of the low-pass filter 41 and output the correction command CC to the low-pass filter 41.

Figure 12:
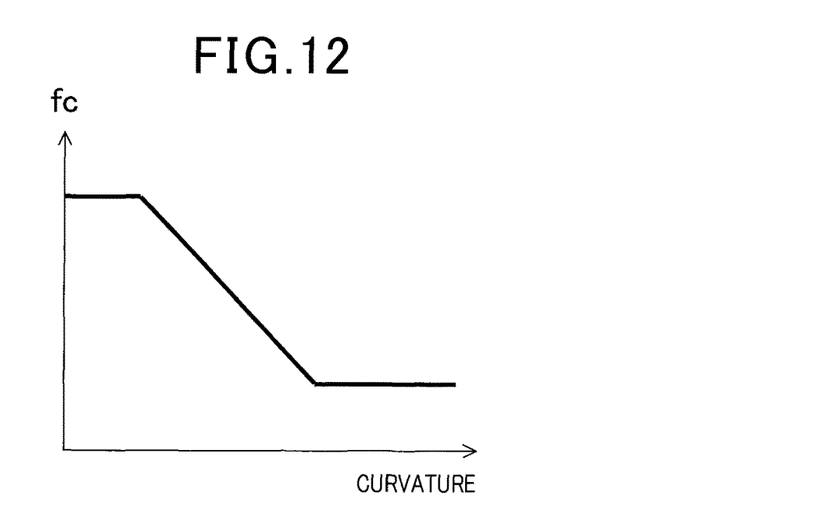
FIG. 12 is a graph which demonstrates a relation between a cut-off frequency of a low-pass filter and a curvature of a road on which a system vehicle is running.

Specifically, the tracking response calculator 40 performs a program in FIG. 12.

After entering the program, the routine proceeds to step S6 wherein the environmental information is derived in the same way as in step S1 of FIG. 4.

Subsequently, the routine proceeds to step S7 wherein the cut-off frequency fc is determined as a function of the environmental information.

Specifically, the cut-off frequency fc is determined as a function of the curvature of the road on which the system vehicle is now running. Specifically, the cut-off frequency fc is, as illustrated in FIG. 12, decreased with an increase in curvature of the road. The cut-off frequency fc is delimited by an upper and a lower limit which are preselected.

Figure 13:
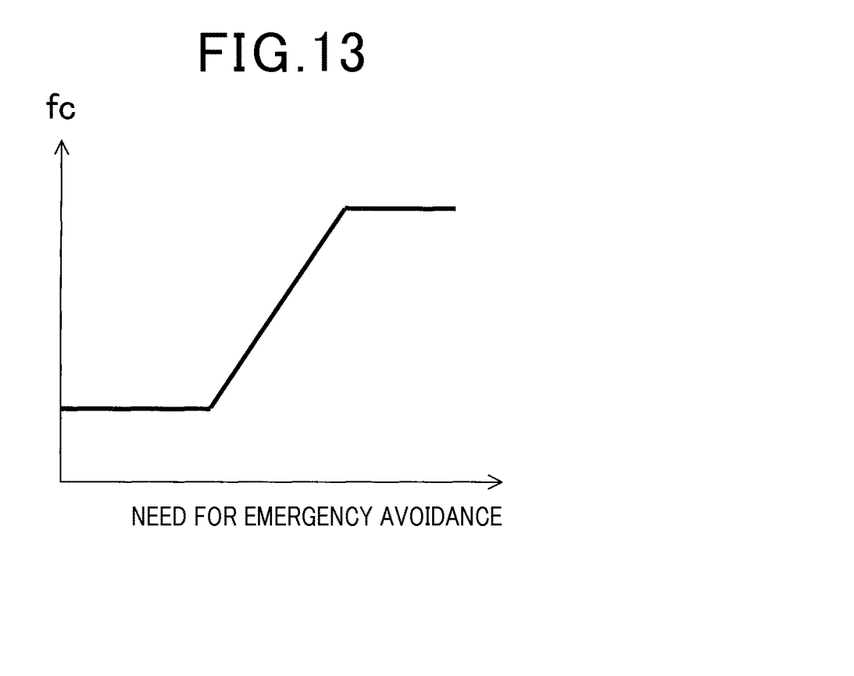
FIG. 13 is a graph which demonstrates a relation between a cut-off frequency of a low-pass filter and a degree of need for emergency avoidance.
Figure 14:
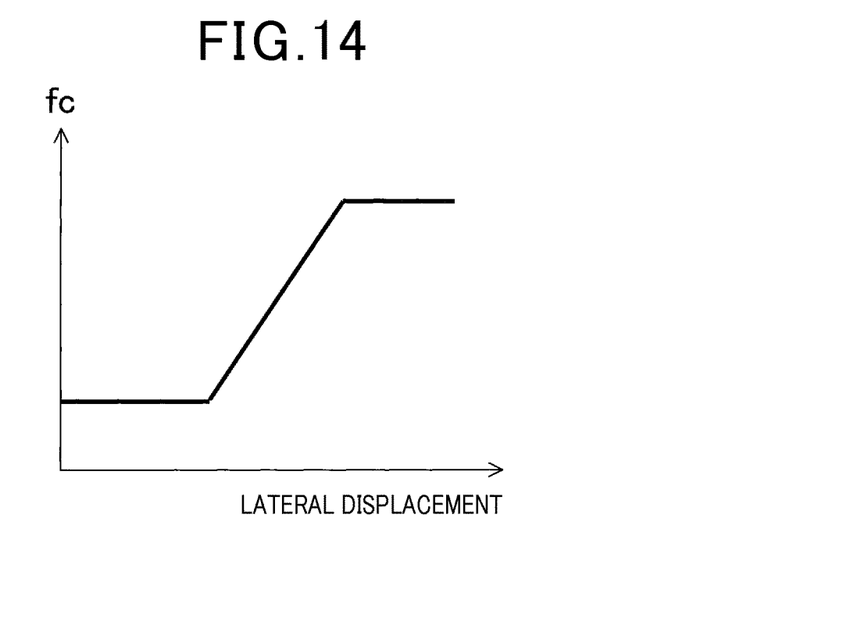
FIG. 14 is a graph which demonstrates a relation between a cut-off frequency of a low-pass filter and a lateral displacement that is a deviation of a system vehicle from a target position in a lateral direction within a traffic lane.

The cut-off frequency fc may also or alternatively be determined as a function of the need for emergency avoidance. Specifically, the cut-off frequency fc is, as illustrated in FIG. 13, increased with an increase in need for emergency avoidance. The cut-off frequency fc is delimited by an upper and a lower limit. The cut-off frequency fc may also or alternatively be determined as a function of the lateral displacement. Specifically, the cut-off frequency fc is, as illustrated in FIG. 14, increased with an increase in the lateral displacement. The cut-off frequency fc is delimited by an upper and a lower limit.

Figure 15:
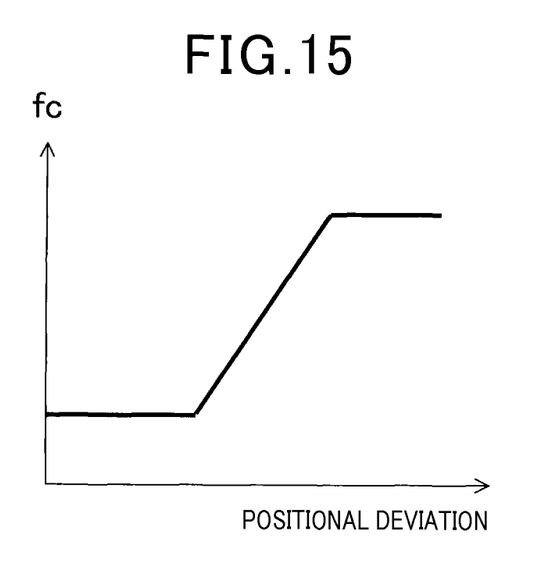
FIG. 15 is a graph which demonstrates a relation between a cut-off frequency of a low-pass filter and a positional deviation of the system vehicle from a target locus predetermined when a system vehicle starts running.

The cut-off frequency fc may also or alternatively be determined as a function of the positional deviation of the system vehicle from the target locus. Specifically, the cut-off frequency fc is, as illustrated in FIG. 15, increased with an increase in the positional deviation. The cut-off frequency fc is delimited by an upper and a lower limit.

In step S7, the tracking response calculator 40 calculates the cut-off frequency fc as a function of at least one of the above environmental parameters for the system vehicle which are expressed by the environmental information and produces the correction command CC which indicates the value of the cut-off frequency fc. The tracking response calculator 40 outputs the correction command CC to the target tracking control calculator 30 to set the cut-off frequency fc of the low-pass filter 41 to the value indicated by the correction command CC. The cut-off frequency fc may also be corrected, like the responsiveness α in the first embodiment, depending upon the selected control mode which is one of the steering control modes, in other words, one of the applications, as illustrated in FIG. 9, selected by the system vehicle to be executed in the selected one of the steering control modes.

The increase in cut-off frequency fc of the low-pass filter 41 will result in a widened frequency band through which signals are admitted to pass, which improves the responsiveness α. Conversely, the decrease in cut-off frequency fc of the low-pass filter 41 will result in a narrowed frequency band through which signals are admitted to pass, which decreases the responsiveness α.

Referring back to FIG. 4, after step S7, the tracking response calculator 40 then repeats the program.

Beneficial Effects of the Electric Power Steering System of the Second Embodiment The electric power steering system 1A is, as described above, equipped with the low-pass filter 41 which filters a target value (i.e., the target angle θ*). The tracking response calculator 40 changes the cut-off frequency fc of the low-pass filter 41. This enables the response rate of the tracking command TC to be set as a function of the frequency of the target value when changing.

MODIFICATIONS

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiment which can be embodied without departing from the principle of the invention as set forth in the appended claims.

A plurality of functions to be performed by one of structural elements of the electric power steering system 1 may be shared with two or more of the structural elements. Alternatively, the functions to be performed by two or more of the structural elements may be assigned to only one of the structural elements. At least one of the above structural elements may be replaced with a known means. One or some of the above structural elements may be omitted.

The electric power steering system 1 or 1A in itself or a portion thereof may be realized by logical programs to be executed by a computer, a non-transitory computer readable medium in which such programs are stored, or an electrically steering control method.

Figure 10:
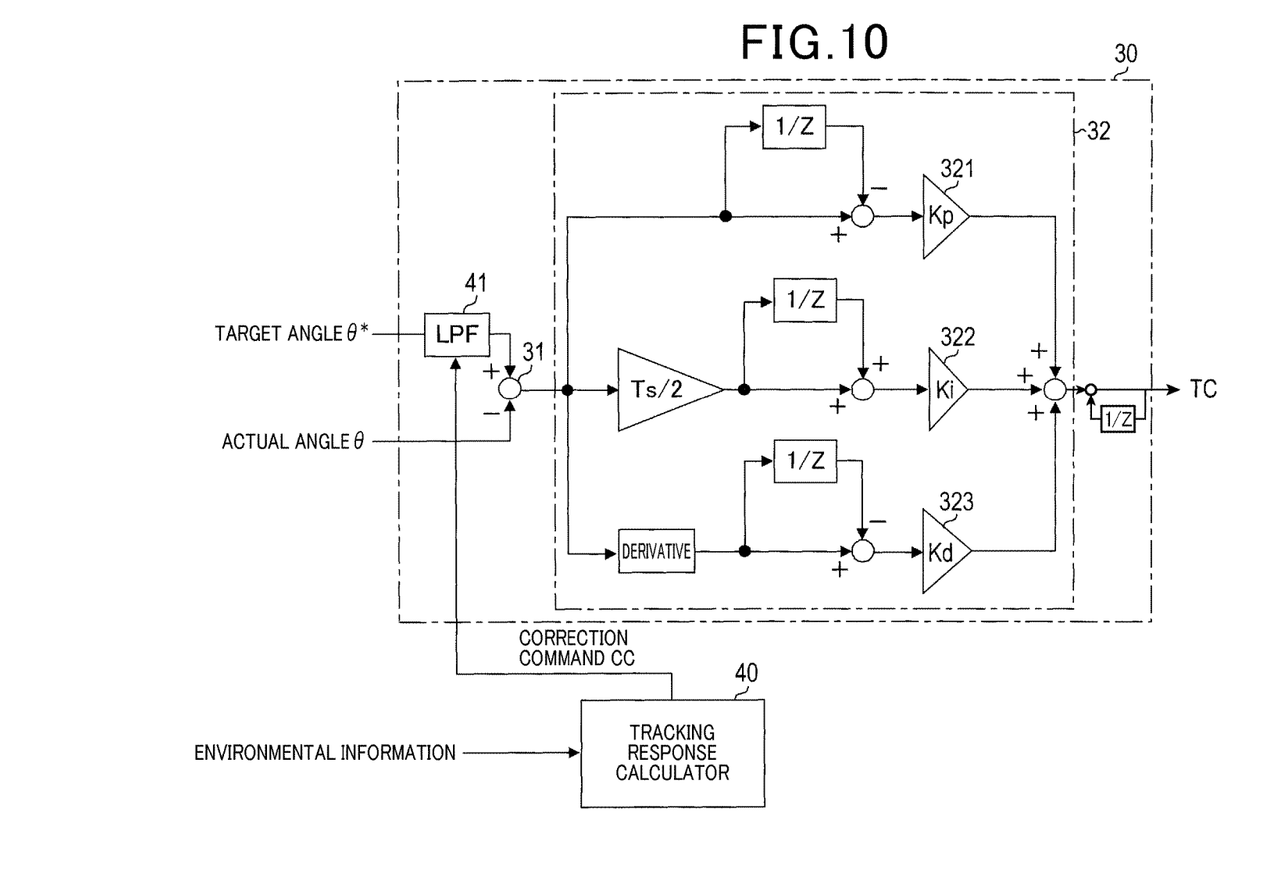
FIG. 10 is a block diagram which illustrates a structure of an electric power steering ECU installed in an electric power steering system of the second embodiment.
Figure 11:
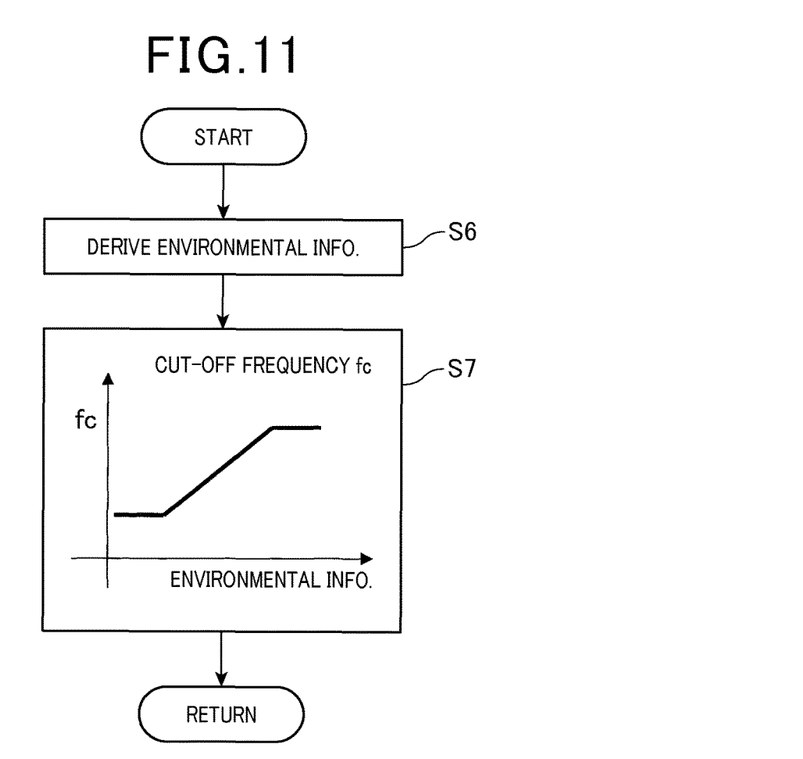
FIG. 11 is a flowchart of a program to be executed by a tracking response controller installed in the electric power ECU of FIG. 10 to determine a response rate in a tracking control mode.
Figure 16:
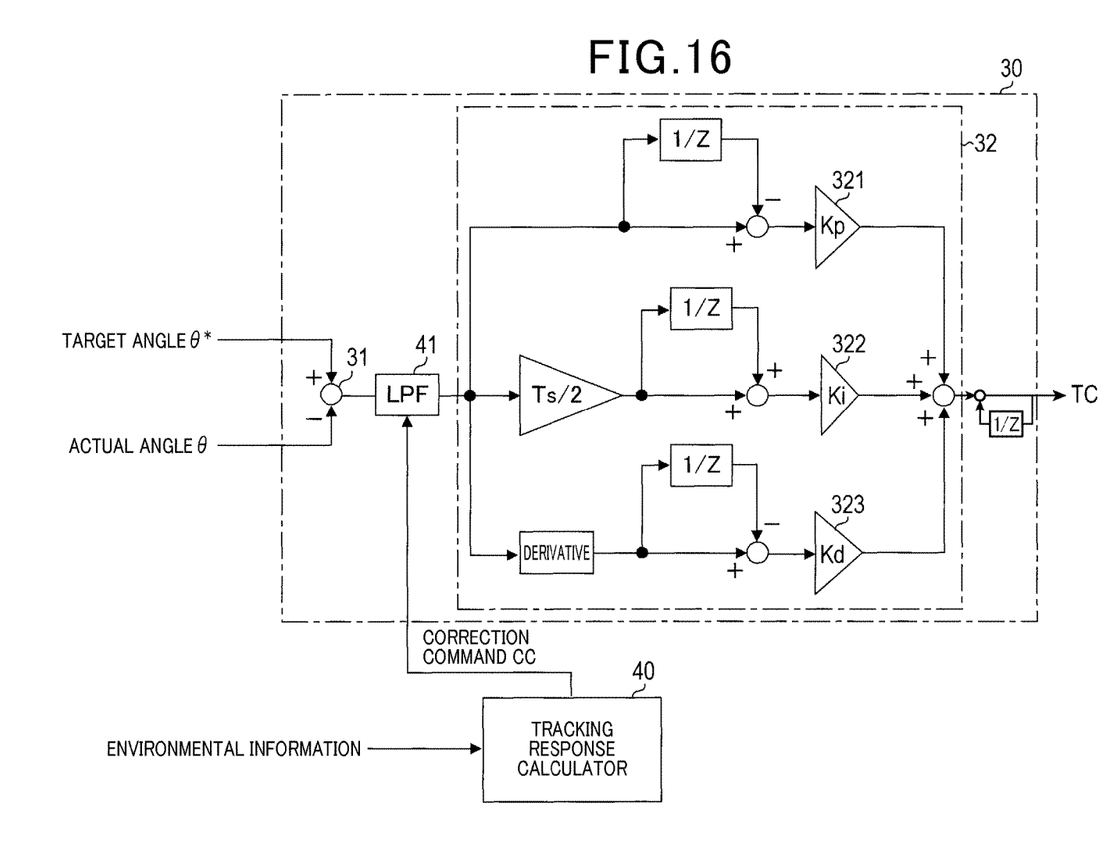
FIG. 16 is a block diagram which illustrates a structure of a modification of an electric power steering ECU installed in an electric power steering system.

For instance, the electric power steering system 1A may alternatively be equipped with a low-pass filter 43, as illustrated in FIG. 16, instead of the low-pass filter 41 of FIG. 10. The low-pass filter 43 works to filter a deviation of the actual angle θ (i.e., a detected value of the physical quantity) from the target angle θ* (i.e., the target value of the physical quantity).

The tracking response calculator 40 outputs the correction command CC to the low-pass filter 43 to change the cut-off frequency fc thereof. This enables the response rate of the tracking command TC, that is, the response rate at which the detected value of the physical quantity (i.e., the actual angle θ) is brought into agreement with the target value of the physical quantity (i.e., the target angle θ*, that is, the target course set in the traffic lane) to be set as a function of the frequency of the deviation of the detected value from the target value when the deviation is changing.

What is claimed is:

1. An electric power steering system for a vehicle equipped with a steering mechanism through which steering power is transmitted from a mechanical steering member which is manually operated by a vehicle operator of a system vehicle having this system mounted therein comprising:

an electric motor which is joined to the steering mechanism and works to output torque for steering the system vehicle;

a torsion bar which is installed in the steering mechanism and located between the mechanical steering member and a joint of the electric motor and the steering mechanism;

a torsion sensor which measures twisting of the torsion bar as a steering torque;

an assist controller which works to determine an assist command as a function of the steering torque, as derived by the torsion sensor, the assist command being to produce assist torque through the electric motor for assisting in turning the mechanical steering member;

a target tracking controller which works to determine a tracking command which produces through the electric motor automatic steering torque which brings a value of a given physical quantity associated with steering of the system vehicle into agreement with a target value;

a response controller which works to control a response rate at which the value of the given physical quantity is brought by the target tracking controller into agreement with the target value; and a motor driver which works to actuate the electric motor based on sum of the assist command and the tracking command to output the torque for steering the system vehicle, further comprising environmental information obtaining means for obtaining environmental information about the system vehicle, and wherein the response controller changes the response rate as a function of the environmental information.

2. An electric power steering system as set forth in claim 1, wherein the response controller also serves to alter a frequency characteristic of the tracking command according to the environmental information.

3. An electric power steering system as set forth in claim 1, further comprising environmental information obtaining means for obtaining environmental information about the system vehicle, and wherein the response controller changes a frequency characteristic of the tracking command as a function of the environmental information.

4. An electric power steering system as set forth in claim 1, wherein the target tracking controller includes at least one control unit which produces the tracking command, and wherein the response controller changes a control parameter provided by the control unit for use in changing the response rate.

5. An electric power steering system as set forth in claim 4, wherein the target tracking controller is implemented by a PID controller, and wherein the control parameter provided by the control unit is a gain to be applied to one of a proportional term, an integral term, and a derivative term in a PID algorithm used in the target tracking controller.

6. An electric power steering system as set forth in claim 1, further comprising a low-pass filter which filters the target value, and wherein the response controller changes a cut-off frequency of the low-pass filter to alter the response rate.

7. An electric power steering system as set forth in claim 1, further comprising a low-pass filter which filters a deviation of the value of the given physical quantity from the target value, and wherein the response controller changes a cut-off frequency of the low-pass filter to alter the response rate.

8. An electric power steering system as set forth in claim 1, wherein the environmental information obtaining means derives a curvature of a road on which the system vehicle is running, and wherein the response controller serves to decrease the response rate with an increase in the curvature of the road.

9. An electric power steering system as set forth in claim 1, wherein the environmental information obtaining means derives a need for emergency avoidance which represents a degree of need for the system vehicle to perform an emergency avoidance maneuver, and wherein the response controller serves to increase the response rate with an increase in the need for the emergency avoidance.

10. An electric power steering system as set forth in claim 1, wherein the environmental information obtaining means derives a lateral displacement that is a deviation of the system vehicle from a target position in a lateral direction within a traffic lane, and wherein the response controller serves to increase the response rate with an increase in the lateral displacement.

11. An electric power steering system as set forth in claim 1, wherein the environmental information obtaining means derives a positional deviation of the system vehicle from a target locus predetermined when the system vehicle starts running, and wherein the response controller serves to increase the response rate with an increase in the positional deviation.

12. An electric power steering system as set forth in claim 1, wherein the environmental information obtaining means derives selected control mode information which indicates a selected one of steering control modes to be performed by the system vehicle, and wherein the response controller serves to set the response rate to a value preselected for the selected one of the steering control modes.

* * * * *